March 10, 1936. J. A. FLYNN 2,033,279
LOW LEVEL INDICATOR ON STORAGE BATTERIES
Filed July 28, 1934
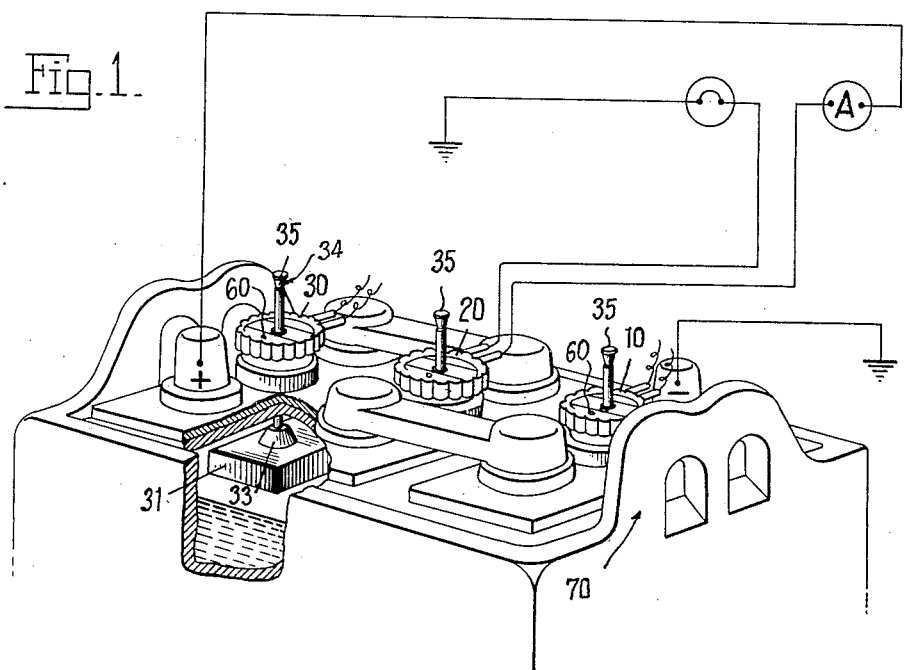
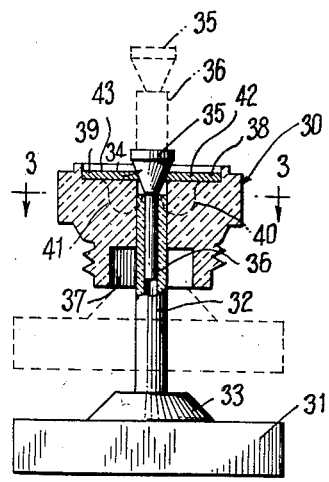
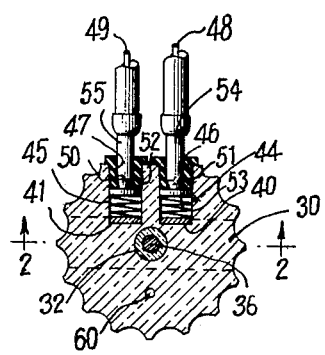
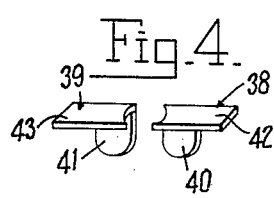
INVENTOR
John A. Flynn
BY
Austin & Dix
ATTORNEYS Patented Mar. 10, 1936

2,033,279

UNITED STATES PATENT OFFICE 2,033,279

LOW LEVEL INDICATOR ON STORAGE BATTERIES

John A. Flynn, New York, N. Y.

Application July 28, 1934, Serial No. 737,335

5 Claims. (Cl. 200—84)

This invention relates to an improved storage battery, and, more particularly, the invention pertains to a cap for a storage battery, and preferably including an associated indicating means.

Heretofore it has been attempted to manufacture and use electrolyte indicating mechanisms for storage batteries, but corrosion, multiplicity of moving parts, and various other disadvantages have made such attempts useless and impractical, both from a mechanical and an economic standpoint.

The invention as herein set forth eliminates the above difficulties.

One of the features of this invention is the provision of an indicating means that is mechanically operable under conditions where corrosion is likely to occur as well as a device that can be manufactured with minimum waste of material and the assembly of which may readily be accomplished at a reduced cost.

A more specific feature resides in the provision of an indicator device with contact points imbedded or molded in place in the cap.

A still further advantage is the improved construction of novel outside lead terminals, preferably provided with resilient attaching means, thereby allowing the contact points to be imbedded within the cap and therefore reducing to a minimum the corrosion.

A more particular feature is the provision of a corrosion resistant removable contact member for closing the circuit when the battery electrolyte has fallen to a predetermined undesirable level.

Other objects, features and advantages will become apparent as the following detailed description of the invention proceeds with reference to the accompanying drawing, wherein:

Fig. 1 is an elevation, partly in section, of a storage battery showing the indicating mechanism and associated parts;

Fig. 2 is a vertical cross-section along line 2—2 of Fig. 3 of the indicating mechanism, certain parts in cross-section and others in elevation;

Fig. 3 is a horizontal cross-section, taken along line 3—3 of Fig. 2, showing outside lead connections, and Fig. 4 is an elevation of the commutator lugs of the indicating mechanism.

Referring now to Fig. 1, there is shown a three cell storage battery 70, with three indicating devices, 10, 20 and 30, attached, so that one is provided for each one of the three cells of the battery. Device 20 is hooked up so as to illustrate how it may be used in co-operation with an indicating means, such as an electric light bulb, attached at a conspicuous point in the car, motorboat, or wherever the device or its equivalents may be used.

Now, referring to Figs. 1, 2 and 3, we have shown an outside threaded cap 30 associated with a float 31 and spindle member 32, firmly set into float 31 by means of the collar 33. Inserted into spindle 32 is a contact member 34, consisting of a frustro-conical shaped head piece 35 and stem member 36. Member 34 is set into spindle 32 by means of a snug fit, thereby making the contact piece 34 adjustable. It is therefore possible to adjust the mechanism for different types of batteries and for different desired results.

Spindle 32 slides through cap 30 by means of an internally tapped channel, said channel being reinforced at its lower edge by collar member 37. The sliding of spindle 32 is governed by float 31, which is operated by its rise and fall, indicating the height of the electrolyte in the battery.

The cap 30 is preferably constructed so as to contain two opposed and imbedded commutator elements 38 and 39, which complete a circuit through an indicator when member 34 contacts them. Members 38 and 39 preferably consist of upper plates 42 and 43 integrally associated with lugs 40 and 41 so as to make continuous commutator elements. These members 38 and 39 are preferably molded in place into the cap 30.

The lugs 40 and 41 are reached by the outside lead wires by means of transverse cylindrical apertures in which are set contact springs 43 and 44, consisting of a spring portion and contact plates. At the outward edge of the cylindrical aperture there are placed collared bushings 46 and 47 to form a snug fit either by cementing or integrally forming them to the cap 30. The bushings help materially to reduce corrosion and should be made of corrosion resistant material, and, if desired, rubber can be very conveniently and effectively employed.

The outside lead wires 48 and 49 are provided with specially constructed contact leads so as to insure a tight fit as well as to insure positive contact with depending elements 40 and 41. These leads consist of tips 50 and 51, made of an electrical conducting material, that engage contact plates 52 and 53. The necks 54 and 55 of the leads are made so as to engage snugly the collar members 46 and 47, thereby preventing the admission of air, battery electrolyte, or any liquid to the contacts.

Cap 30 is further provided with a hole through which the accumulation of acid fumes from the electrolyte may gain exit, thereby helping to prevent corrosion.

The preferred form of the invention embodies the use of non-corrosive materials wherever possible so as to eliminate the necessity of guarding against corrosion, when it could easily be avoided. By the production of airtight apertures for the spring contact leads, there has been eliminated the ever prevalent difficulty of maintaining strong, clean contacts, thereby insuring the flow of current and the operation of the light or other warning device. It has been difficult to keep similar devices in working order; however, by means of the improved structure, contacts clean from corrosion can be successfully maintained over a longer period of time than by any other apparatus heretofore known.

In the operation of the improved device it will be noted that as the electrolyte in the battery is reduced to a low level, the float 31 with the spindle 32 and contact member 34 falls until it meets and makes contact with commutator plates 42 and 43, thereby closing the circuit and thus indicating that the electrolyte has gone below the predetermined level.

It will be seen that by the present invention, with all the contact points imbedded or concealed entirely in the top, the circuit will be definitely completed, and the device will function with certainty. By means of the removable, adjustable contact peg 34, the time for warning can be very readily and easily adjusted.

It is apparent that the device is operable with the minimum of moving and exposed parts, that it is economically made and installed, that it adds no extra parts to the battery, for it serves the purpose and takes the place of the old cap, in that when the cap is removed there is an aperture for the addition of liquid to the cells, and when put in place it serves as an indicating means of the level of the electrolyte in the battery.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What is claimed is:

1. In a switch mechanism for use with indicators of the low level of liquids, a closure member, a float, a spindle attached to said float, an opening in said closure member adapted to allow the passage of said spindle therethrough, a contact member slidably and removably nested in said spindle, contact plates completely imbedded in said closure member, said contact plates completing a circuit with the contact member in said spindle when said member engages said plates.

2. In the switch mechanism as claimed in claim 1, the improved contact plates comprising depending lugs imbedded in closure member, and electrical jack connections, imbedded in said closure member in electrical association with said lugs.

3. In the switch mechanism as claimed in claim 1, the improved contact member comprising a member nested in frictional gripping relation with the socket portion of a spindle said member manually adjustable within said spindle and manually removable from said spindle.

4. A switch for low level indicating mechanisms including, in combination, a float, a spindle associated therewith, contact means slidably mounted in said spindle, a cap to receive said spindle, contact plates imbedded within said cap, said contact plates cooperating with contact means in spindle to complete a circuit, unitary lug members on said contact plates and imbedded in said cap, said cap being provided with openings adapted to receive outside lead terminals, said openings so positioned as to permit said outside lead terminals to contact said lugs.

5. A device of the character described, a cap with a vertical hole, two contacts level with upper surface and imbedded in cap and flush with hole, a lug integral with each of said plates and extending downwardly and also imbedded in said cap, a spindle extending through the hole and adapted to be moved therein, a float member attached to lower end of spindle and adapted to be moved by the electrolyte in the battery, an electrical conducting member adjustably mounted in top of said spindle and adapted to engage contact plates when said float and said spindle have dropped because of the low level of the electrolyte in the battery, said cap having openings on the sides thereof leading to lugs, electrical lead terminals, positioned in said openings and in resilient engagement with said lugs and non-corrosive collars surrounding said terminals and adapted to engage said cap at openings leading to said lugs.

JOHN A. FLYNN.